Sept. 16, 1924.

A. E. OSWALD 1,508,407

TYPEWRITER STROKE AND WORD COUNTING AND SIGNALING DEVICE AND SPEED INDICATOR

Filed Oct. 28, 1919  8 Sheets-Sheet 1

Sept. 16, 1924. 1,508,407
A. E. OSWALD
TYPEWRITER STROKE AND WORD COUNTING AND SIGNALING DEVICE AND SPEED INDICATOR
Filed Oct. 28, 1919 8 Sheets-Sheet 3

Inventor:
Alfred E Oswald
by D C Stickney
Attorney

Patented Sept. 16, 1924.

1,508,407

UNITED STATES PATENT OFFICE.

ALFRED E. OSWALD, OF BOGOTA, NEW JERSEY, ASSIGNOR TO UNDERWOOD TYPE-WRITER COMPANY, OF NEW YORK, N. Y., A CORPORATION OF DELAWARE.

TYPEWRITER STROKE AND WORD COUNTING AND SIGNALING DEVICE AND SPEED INDICATOR.

Application filed October 28, 1919. Serial No. 333,989.

*To all whom it may concern:*

Be it known that I, ALFRED E. OSWALD, a citizen of the United States, residing in Bogota, in the county of Bergen and State of New Jersey, have invented certain new and useful Improvements in Typewriter Stroke and Word Counting and Signaling Devices and Speed Indicators, of which the following is a specification.

This invention relates to exhibition apparatus, and is herein disclosed as applied to an apparatus especially adapted to be used in connection with a magic lantern, such as may be used for the purpose of advertising or for the display of scientific facts.

The invention is herein described as especially adapted to display the data shown by the typewriter speed and word-counting mechanism, which is disclosed in my co-pending application, Serial No. 260,220, filed October 29, 1918. To draw the attention of the public to the words counted, in the apparatus disclosed in said application, there is herein shown a screen on which are adapted to be automatically shown attractive or informative images in connection with an image of the result of the word-counting. There may also appear upon the screen an arm like the second hand of a clock, which is adapted to indicate elapsed time, thus enabling anyone viewing the image to see both the number of words written and the time visibly displayed upon the screen.

According to the present disclosure, images may be superposed one upon the other, in such a way that the informative image lies without a clock face, and the image of the dials of the counter, indicating the number of words written, may lie within the clock image, thus making an attractive display, well calculated to hold the attention of those viewing it and to impress upon their minds the desired facts. As illustrated herein, the device is adapted to form part of a portable box, that is, a box adapted for shipment, by express or otherwise, the box containing the screen, a magic-lantern outfit, and a projection outfit, as well as mechanism for controlling the necessary moving parts, and for superposing the image of the projection outfit and the magic-lantern outfit. The box may include doors adapted to give easy access to the various parts, and may be so constructed as to present a neat appearance when closed, when substantially nothing is visible from the outside except the push buttons which control the necessary lights and mechanism, and the handles to the doors.

Other features and advantages will hereinafter appear.

In the accompanying drawings:—

The substantially rectangular box 1, which forms the casing, has at its front end a circular opening 2, behind which lies a glass plate 3, supporting a translucent piece of tracing cloth 4, upon which images from the lenses 5 and 6 may be projected.

The glass plate 3 is supported in suitable slides 7, which extend vertically of the box 1, and are fast to the sides thereof, on the interior of the box. The glass 3 and the cloth 4 may be inserted from the top through a slot 8, which may be covered by the strip 9 to shut out all light. The slides 7 are slotted at 10 to hold the glass firmly at the focal plane, and the glass may rest upon a bottom strip 11, also lying within the casing 1. The image usually projected upon the screen 4 comes from the lens 5, it being the image displayed upon one of the slides 12 which is mounted across one of the openings 13 of the disk 14, which rotates at the focus of the lens 5 in front of a lamp 15 adjustable behind a condensing lens 16.

Owing to the fact that there are two lenses 5 and 6, part of the image of one of them is necessarily somewhat out of focus, and it is found advantageous to place both lenses at a slight angle to the screen 4, with the result that the margins of the image formed by each lens is slightly out of focus, but neither is materially out of focus. Under these conditions, a tracing cloth screen 4 is found far superior to ground glass. Moreover the lens 5 is found to give a somewhat more satisfactory image with the component lenses 17 reversed instead of set as in the conventional form shown in Figure 2.

When it is desired to exhibit an image on one of the slides 12 through the lens 5, the operator depresses a push button 18, to close the circuit from the main 19 which may be an ordinary lighting circuit, viz, 110 volts, and light the high candle power lamp 15, thus projecting the image shown on the slide 12 through the lens 5 upon the screen 4. Closing this circuit also automatically starts a motor 21, to which the lamp 15 is connected in parallel by the lead wire 22. The return circuit of both the motor 21 and the lamp 15 is diagrammatically shown by the ground 23. The motor 21 is connected to the fan 24 which is located above and at the edge of a partition 25, having suitable ventilating openings 26, said partition starting below the top 27 of the casing and being advantageously made of asbestos board, with the result that the fan keeps the air in circulation past the lamp 15, up through the openings 26 and around inside the casing 1. The top 27, moreover, is pierced with openings 28 to allow the fan to continually circulate air through them and through openings 29 in the bottom 30 of the casing. The side 31 of the casing is also lined with asbestos board 32 as well as the rear door 33, and there is also provided a vertical partition 34 having an opening 35 below the fan. The push button 18 may be of the usual form, having two finger ends 36, and so constructed that when depressed the circuit remains closed.

If it is desirable to change the slide behind the lens 5, for reasons to be pointed out hereinafter, the operator starts the disk 14 to rotate. To do this, he depresses a second double push button 38, thereby closing a circuit from the main 19 by a conductor 39 through a motor 40, which has a circuit completed through it by a conductor 41, diagrammatically shown as a ground. The motor 40 drives the disk 14 by a worm 42, which is fast upon the motor shaft and meshes with the worm wheel 43ª, fast upon the axle or shaft 43 of the disk 14, journaled in the mounting plate 44. The disk 14 normally tends to turn with the shaft 43, because it is frictionally held thereto by the compression spring 45 lying within a boss 46 on the hub 47 of the disk 14. The disk, however, is normally prevented from turning because one of six teeth 48, projecting from its periphery, normally engages a flat sided pin 49 on an escapement lever 50 pivoted on the mounting plate 44 at 51. The turning of the motor 40, however, intermittently releases the teeth 48 from the pin 49, and, for this purpose, there is fast upon the axle 43 a small pinion 52, meshing with a large pinion 53, which, in turn, drives another larger pinion 54, by means of a smaller pinion 55, fast to its hub, thus giving a very slow motion to the pinion 54, with the result that a series of lugs 56 fast on the pinion 54 turn with it, thus intermittently raising a bell crank follower arm 57 and rocking the escapement lever 50. When the escapement lever 50 is thus rocked, the pin 49 releases the tooth 48 which it has been holding, and a second pin 58 upon the lever is brought into the path of the next tooth 48 on the disk 14, with the result that said next tooth 48 will arrest the disk 14. When the lug 56 passes clear of the follower 57, a spring 59 swings the escapement lever 50 back to its first position, so that the pin or tooth 49 will next arrest the disk 14. The lugs 56 and the spaces between them are so proportioned that the time interval between the movements of the disk 14 is substantially equal. The teeth 48 and the openings 13 are so positioned that the slides 12, on the openings 13 are successively brought before the lens 5, so that the images thereon are presented on the screen 4. When it is desired to maintain one of said slides in position behind the lens 5, the double push button 38 is shifted in the opposite direction, thereby opening the circuit through the motor 40.

Figure 3:
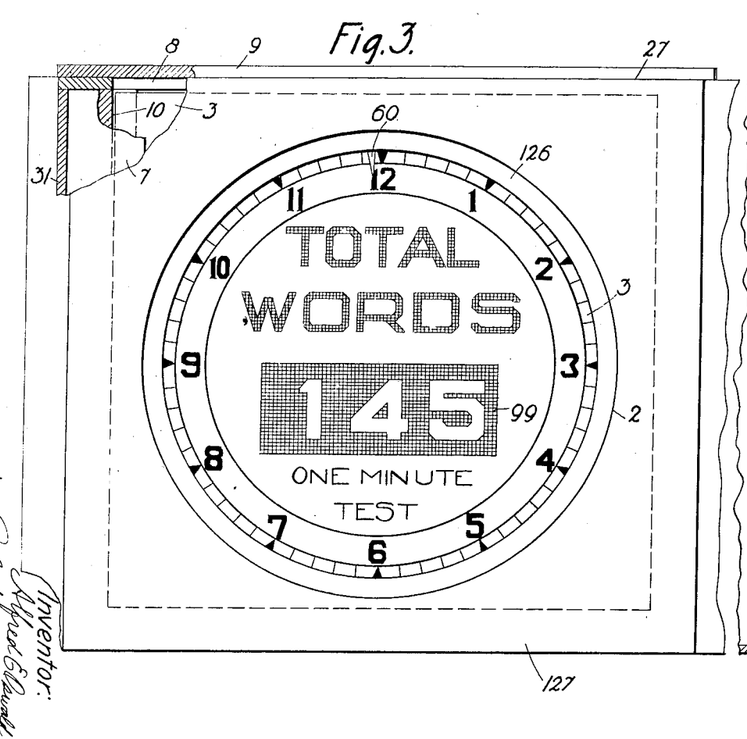
Figure 3 is an end view, showing an image displayed on the screen.
Figure 4:
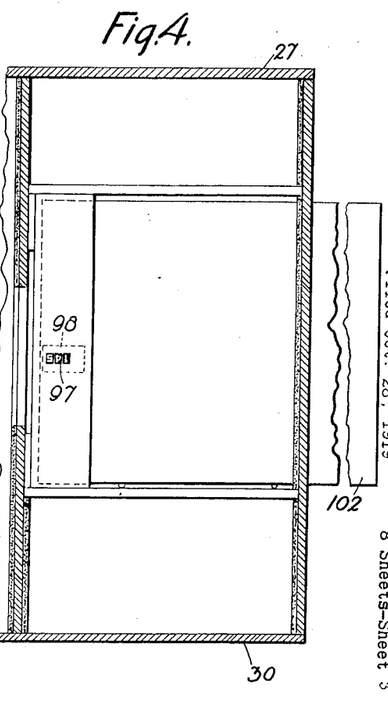
Figure 4 is a sectional front view of part of the box taken along line 4—4, Fig. 2, and showing the counter of which the image appears in Figure 3.
Figure 5:
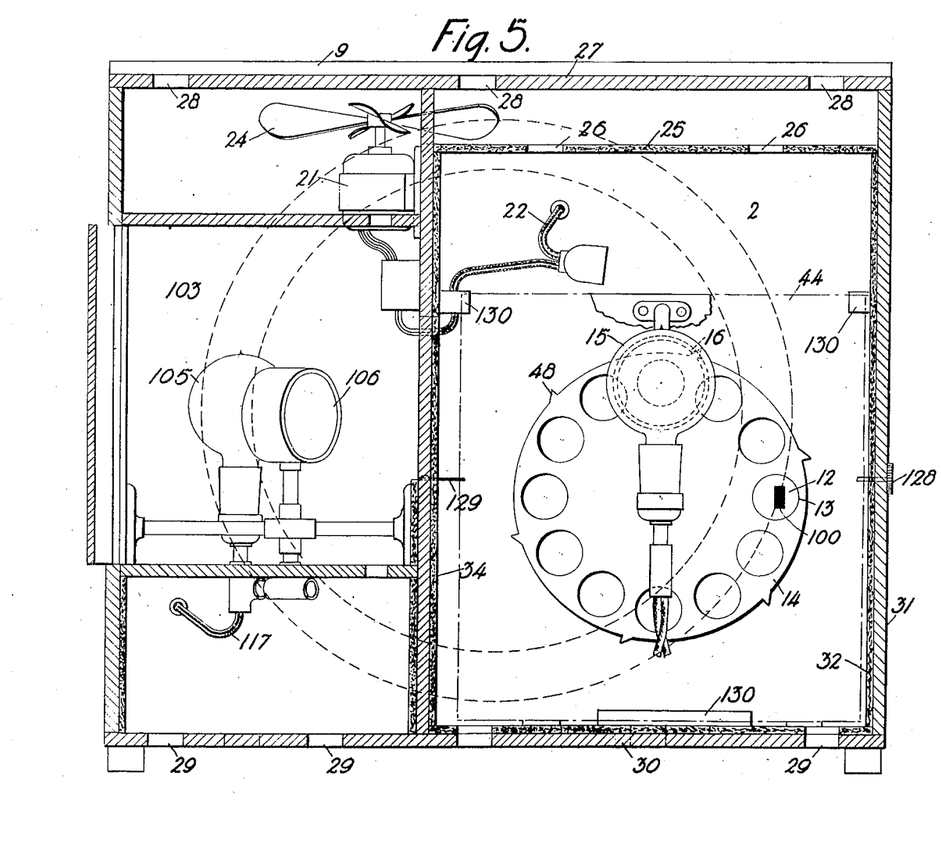
Figure 5 is a sectional rear view, taken behind the lamps which serve to project the image upon the screen.
Figure 6:
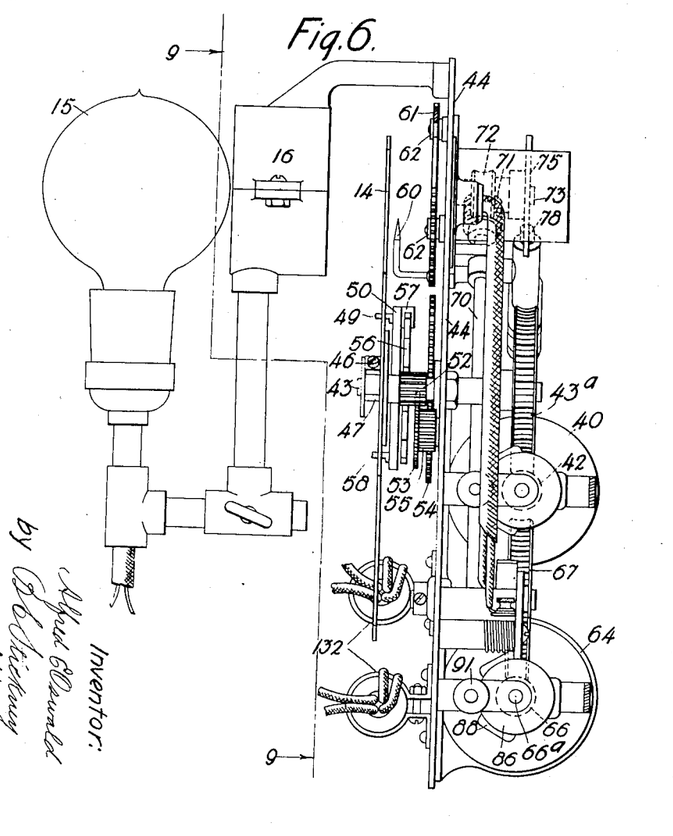
Figure 6 is a side view of the magic lantern mechanism, seen in the lower left-hand part of Figure 2.
Figure 7:
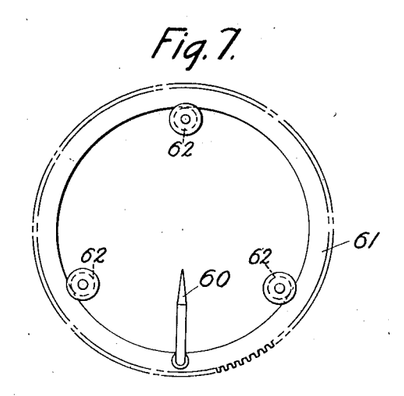
Figure 7 is a view of the second hand, showing how it is mounted.

To enable elapsing time to be shown upon the screen 4, there is provided a second hand 60 projecting inwardly from the ring 61, which is journaled by rollers 62, running on its periphery and holding it concentric with the lens 5. The second hand is normally at rest at the Figure 12 position, so that its image appears on the clock face projected by means of a slide 12, as seen in Figure 3. When it is desired to start the second hand, the operator presses a single push button 63 mounted beside the push buttons 36 and 38 in the side 31, thereby closing a circuit through a series motor 64, said motor being connected to the second hand 60 by connections to be presently described. It is found that a series motor driven from an ordinary lighting circuit will run for one minute at a speed so nearly uniform that the average watch will not indicate any error if the circuit is properly adjusted by means of the rheostat 65. The series motor may be one suitable for either alternating or direct current, the only difference in using either current being that the rheostat 65 needs readjusting. The motor 64 has a worm 66, fast upon its shaft 66ᵃ and meshing with a worm wheel 67, which is connected to turn the second hand 60. These connections include a bevel pinion 68, fast upon the worm wheel 67, meshing with a bevel pinion 69, fast upon a shaft 70, which carries a worm 71, meshing with a worm wheel 72, fast upon a shaft 73, which latter carries a pinion 74, having teeth which mesh with teeth upon the periphery of the ring 61, with the result that the turning of the motor 64 rotates the ring 61, and thus carries the hand 60 around the opening 13 which is before the lens 5. Although the pointer or hand 60 is necessarily somewhat out of focus, being out of the plane of the slide 12, it is nevertheless sufficiently in focus to be clearly defined to those who view the screen 4. To make it as clear as possible, the pointer 60 lies just in front of the slide 12, as it is mounted upon the disk 14.

Figure 8:
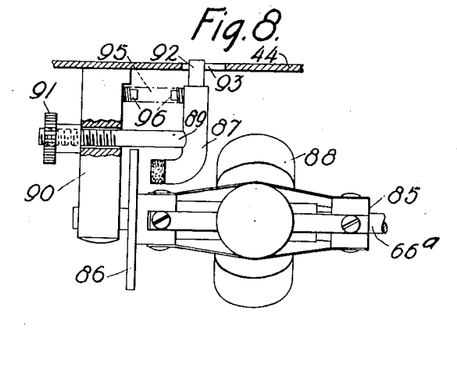
Figure 8 is a side view of a governor for the driving motor connected with the second hand.
Figure 9:
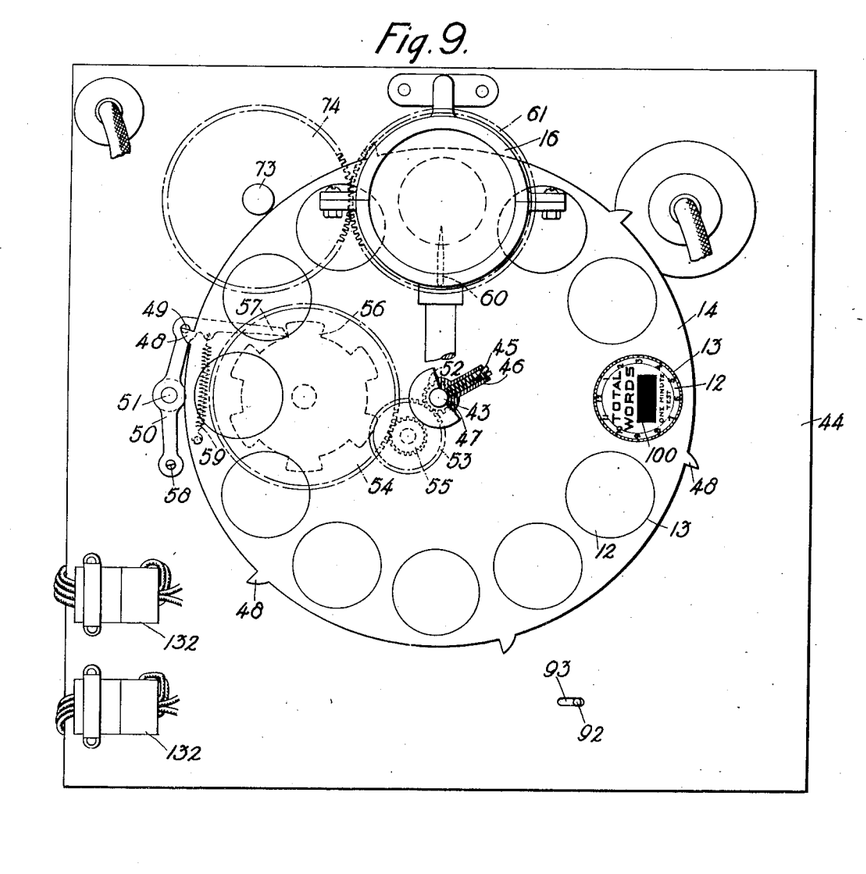
Figure 9 is a rear view in section along line 9—9, Figure 6.
Figures 10, 11, 12:
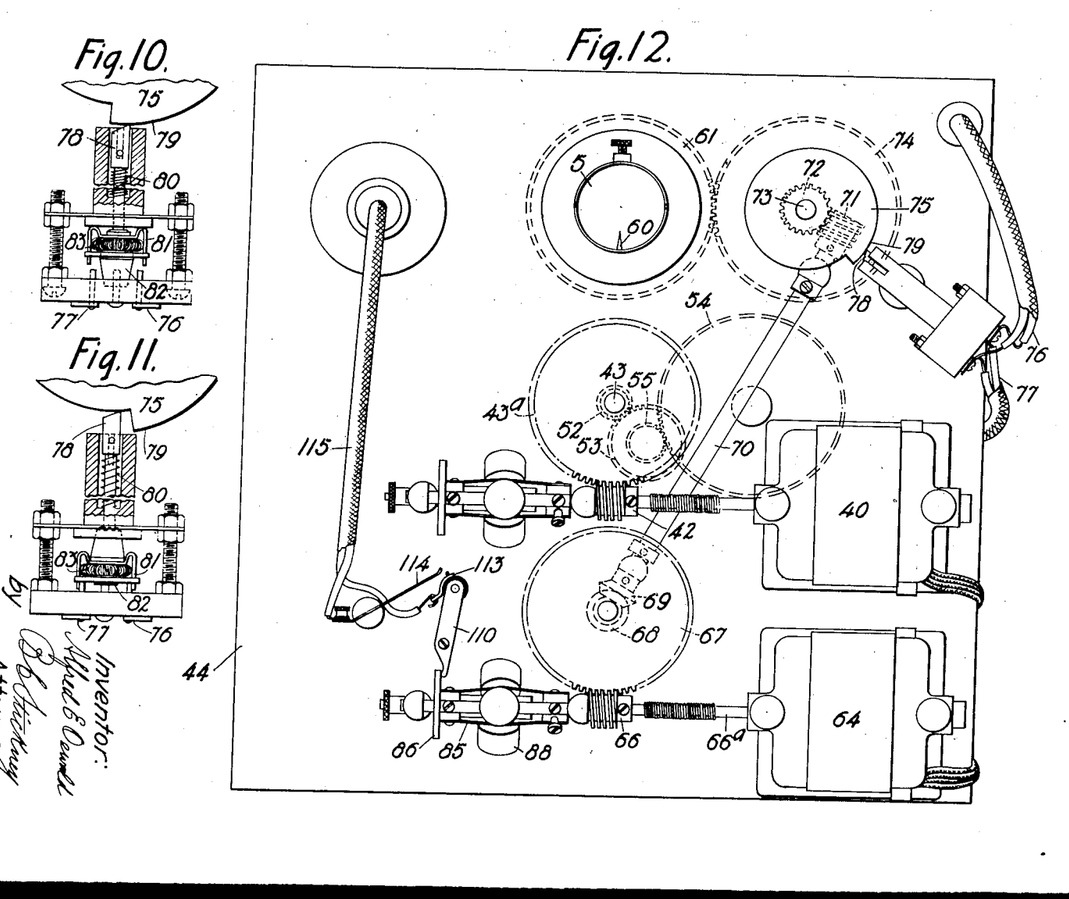
Figure 10 is a side view, partly in section, showing the structure of an automatic circuit breaker with the circuit open.
Figure 11 is a similar view, showing the circuit closed.
Figure 12 is a front view of the magic lantern mechanism, as seen from the right end of Figure 6.
Figure 13:
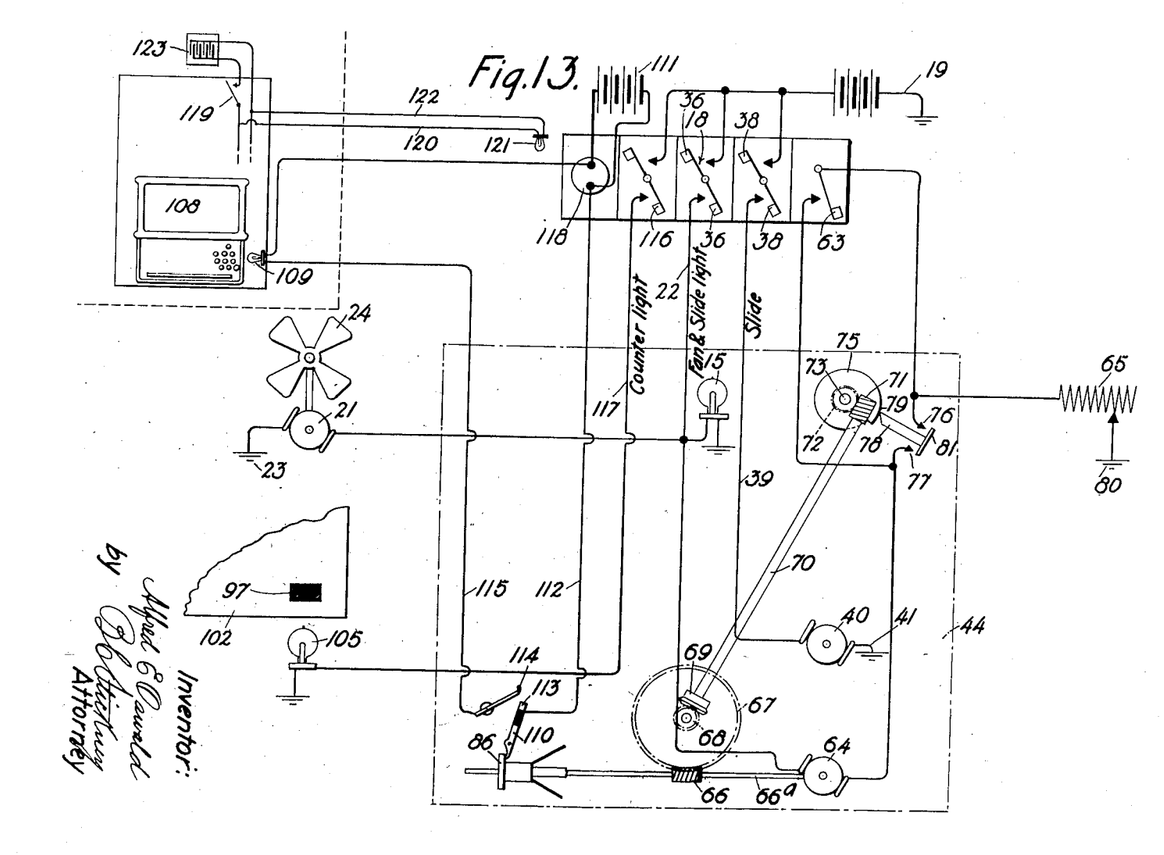
Figure 13 is an electrical diagram, showing the connections between the push buttons, the motors, lamps, etc.

In order to cause the second-hand 60 to be arrested at the end of a single revolution, there is provided a device which holds the current closed through the motor 64 when once closed by the push-button 63, and then breaks the circuit at the end of a revolution of the second-hand. To effect this, the shaft 73 has fast thereon a cam-disk 75, which normally holds a circuit open between two terminals 76 and 77, which are respectively connected to the rheostat 65 and to the motor 64. When the push-button 63 is depressed and the motor 64 starts to turn the shaft 73, the follower 78, which is normally held outwardly by the summit 79 of the cam 75, is pressed inwardly by a spring 80 at the passing of the summit 79, thus causing a bridge 81 to close the circuit between the terminals 76, 77, and thus drive the motor 64, irrespective of the position of the push-button 63. The bridge 81 and the spring 80 form part of a snap-switch, which may be of any desired type, and is herein shown as a Cutler-Hammer switch comprising a double cone 82, fast to the follower plunger 78, and embraced by a coil spring 83 in such a way that when the plunger 78 carries the base of the cones 82 past the spring 83, the coil spring snaps the circuit open or shut, as the case may be. When the circuit is closed by the bridge 81 and the push-button released, the second-hand 60 and the cam 75 continue to revolve, because the motor is driven by the circuit through the bridge 81 until the second-hand comes to its position of rest, at which time the bridge 81 springs clear of the terminals 76 and 77, and breaks the circuit, arresting the second-hand 60. In order to govern the speed of the motor 64, the shaft 66ᵃ thereof, upon which the worm 66 is fast, carries a governor 85, which includes a plate 86, normally standing clear of a friction-arm 87. When the motor 64 starts, the shaft 66ᵃ causes the weights 88 of the governor to spring outwardly, drawing the plate 86 against the arm 87 if the speed of the motor tends to become excessive. Under some circumstances, to obtain the proper speed of the second-hand 60, the plate 86 may bear against the arm 87 during the entire time of the running of the motor. Since the motor 64 is universal, that is, adapted to run on either direct or alternating current, its speed will be somewhat different under different circumstances, except as it is controlled by the governor 85. In order to vary the control of the governor to suit the exigencies of the local current which may be used, the arm 87 has fast thereto a rod 89, extending through a bracket 90 and threaded to receive a thumb-nut 91, which limits the distance that the plate 86 can pull the friction-arm 87 to the right, at Figure 8. In order to prevent the arm 87 from rotating, it comprises an extension 92 passing into a slot 93 in the adjacent plate 44, the slot 93 being long enough to allow for any position of the thumb-nut 91 on the screw-rod 89. To keep the arm 87 at the limit of its throw, a spring 95 may press the arm 87 to the right, said spring being held in position by lugs 96 upon the arm 87 and the bracket 90.

The present device is especially adapted to display upon the screen 4 an image of the number shown upon the wheels 97 of a counter 98 of any ordinary or desired form, said counter being adapted to be operated by the actuation of a typewriter, as set forth in my said co-pending application, Serial No. 260,220, filed October 29, 1918. The counter is advantageously one having white or "silvered" figures upon its wheels 97, the wheels and frame advantageously being dead black, with the result that the image of the numerals upon the wheels 97, when appearing upon the dark rectangle 99 of the image projected by certain of the slides 12 upon the screen, will show in said rectangle in white, right side up, the number shown upside down upon the wheels 97 of the counter, the slides on which the images of the numerals are projected having clock faces thereon. The reasons for having the counter-numbers, the second-hand 60, and slide 12 upside down are well known to those skilled in the magic-lantern art, and will not further be described. The counter 98 preferably has a zeroizing handle 98$^a$, adapted to return the wheels to zero for each exhibition or test of the typewriter. It is for the purpose of producing the black rectangle 99 that the black spot, shown at 100, is provided on one or more of the slides 12. The provision for supporting a plurality of slides 12 on disk 14 was made to enable the exhibition of attractive or informative matter between speed tests or demonstrations. Obviously, only one slide 12 having an opaque rectangle and a clock face may be used, necessitating a complete rotation of disk 14 between speed tests, or a plurality of slides 12 for use for speed tests may be placed at intervals around the periphery of disk 14, so that only a partial rotation of disk 14 between speed tests will be necessary.

In order to position the counter 98 properly, the casing 1 is provided with an opening 101, adapted to receive and hold in position the wooden case 102, in which the counter and a large part of its operating connections are mounted. The casing 102 may be supported in any suitable manner at the back of the casing 1, and is shown at the left of the door 133, as viewed from the left-hand of Figure 2. As thus mounted, the casing 102 forms the back of a compartment 103, which is lined with asbestos board-plates 104, and in which the fan 24 and its motor 21 are mounted. Since the wheels 97 of the counter are opaque, the projected image thereof has to be produced by reflection in order to pass through the lens 6, and, for this purpose, there is provided an adjustable lamp 105, furnished with a condensing lens 106, adapted to throw an intense light upon the wheels 97, the condensing lens 106 being adjustably set as closely to the lens 6, as the exigencies of the design will allow; it being remembered that the light thrown by the lens 106 has to fall upon the wheels 97.

In order to make the image of the digits upon the wheels 97 stand out as clearly as possible, there is provided a screen or shield 107, covering substantially all of the counter and the wheels, except the three wheels which it is usually desired to project the numerals from. This shield 107 is advantageously of dead black, thus absorbing all the light. Owing to the intensity of the light needed for the illumination of the wheels 97, the fan 24 is so placed as to deliver its most effective draught where the heat is greatest. The heat, however, must be kept so low, even at the expense of lighting, as to avoid all risk of fusing or injuring the wheels 97, or other parts of the counter 98. It has been found that the counter-wheels 97 can be read sufficiently clearly for the purpose in hand if they are set even at a slight angle to the screen 4, their image being comparatively narrow.

The casing 1 has been described as substantially rectangular. It is, however, somewhat wider at the back than at the front, in order to allow space for the lamp 105, the cooling space needed around the lamp 15 and the cooling space needed around the other mechanism.

The present apparatus is especially adapted to be used for displaying automatically upon the screen 4 the number of words or the number of letters, as the case may be, which a typist, seated at a typewriting machine 108, writes in one minute, that is, in a single revolution of the second-hand 60.

In order to notify the typist when to begin, the starting of the motor 64 is adapted to signal the typist by means of a signal-lamp 109, which is found to be the most effective way of signaling in a noisy place, especially if the lamp 109 is located at the margin of the keyboard of the typewriter, best at the lower right-hand corner thereof. In order to automatically control this lamp, the governor 85 may include a device adapted to light the lamp when the motor 64 reaches its speed, as it does almost instantly. To effect this, the disk or plate 86 may be adapted to swing an arm 110 in such a way as to close a circuit through the lamp 109. This circuit is advantageously energized by the battery 111, which actuates the counter-mechanism, comprising four cells, furnishing a current of somewhere near six volts. The current from the battery 111 is carried through a conductor 112 to an insulated contact 113 upon the arm 110, the connections being such that when the motor reaches normal speed, the contact 113 is brought against a contact 114, thereby carrying the current through a wire 115 to the lamp 109.

Under some circumstances, I have found it advantageous to operate a bell, in lieu of the lamp, as a signal, operating it by the same circuit, by connections which will be obvious to those skilled in the art. It will be noted that the lamp 109 is lit substantially at the pressing of the push-button 63, because this starts the motor 64, and that the lamp remains lighted, and is only extinguished when the second-hand 60 is stopped by the arresting of the motor when the follower 78 opens the circuit across the terminals 76 and 77. The counter-lamp 105 may be normally unlighted, but adapted to be lighted and to be kept lighted by a push-button 116, of a well-known type, taking its current from the source 19, and connected by a conductor 117 to the lamp 105, which is diagrammatically shown as grounded to complete the circuit. The side 31 of the casing 1 may furnish a mounting for the push-buttons 63, 38, 36 and 116, conveniently located together, and adjacent them may also have a socket 118, of any usual or desired form, to receive a plug connected to the source of current 19.

In order to enable the typist to signal to the operator of the display apparatus that she is all ready to start operating the typewriter, there may be provided at the typewriter a push-button 119 adapted to close a circuit 120, leading to a signal-lamp 121 at the display apparatus and brought back by a conductor 122 to the storage battery 123, said circuit operating a large part of the mechanism within the casing 124 in the base 125 of the typewriter.

In order to enable the spectators viewing the screen 4 to have their vision interfered with as little as possible by distracting lights, the screen 4 is placed at the top of a truncated cone, having sides 126 which extend from the screen 4 to the front 127 of the casing 1, and which are dead black, with the result that the screen 4 is substantially concealed from side lights.

Figure 1:
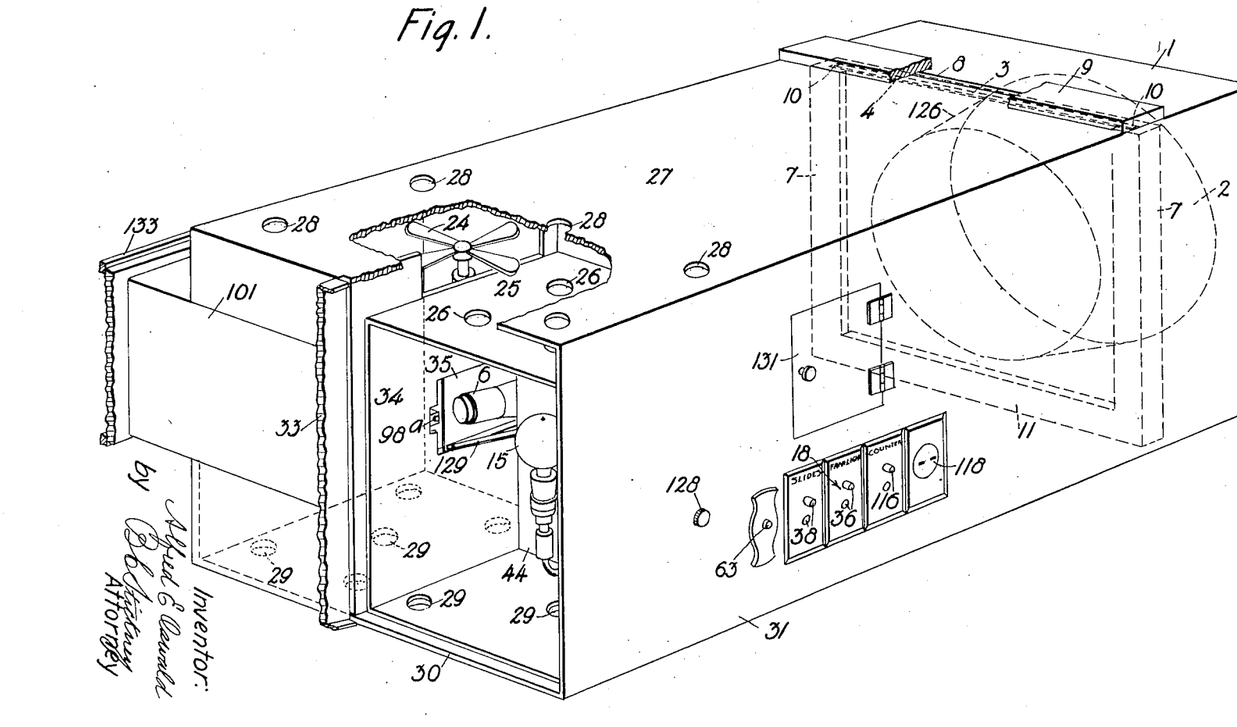
Figure 1 is a perspective view of the box or casing from the rear, part being opened and part being broken away to show some of the internal mechanism.
Figure 2:
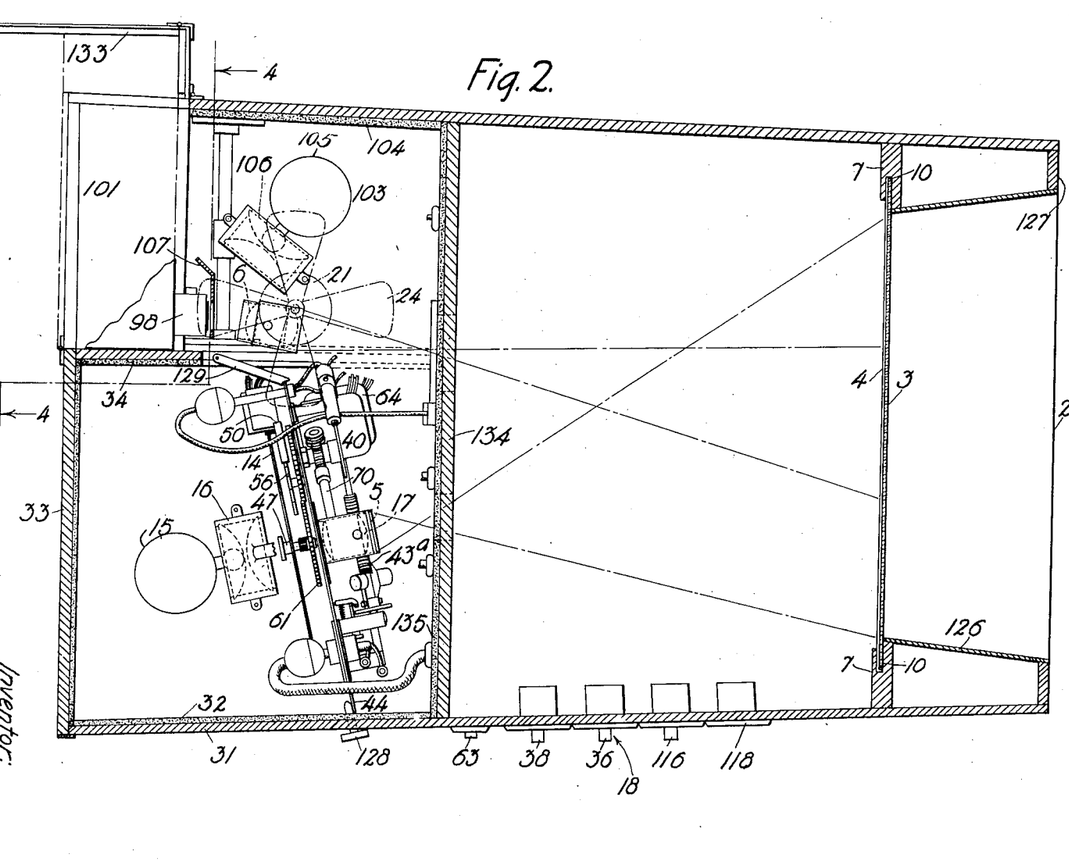
Figure 2 is a sectional plan view of the same.

The plate 44, as best shown in Figure 2, stands at the angle which throws the images of its slides least out of focus, and yet permits the image of the counter 98 to be as little out of focus as possible. To enable the plate 44 to be easily removed for adjustments, etc., it is held by a pin 128 and a pivoted latch 129 against suitably placed lugs 130 within the casing 1. The head of the pin 128 may lie outside the casing, and the latch 129 is advantageously pivoted upon an edge of the opening 35 in the wall 34, thus enabling the pin and latch to engage the plate 44 at the most effective height, viz, half way up.

A suitable side door 131 in the side 31 may give access to the interior of the casing near the wires that lead from the push-buttons 63, 36, 38, and 116, and to the junction boxes 132 on the front of the plate 44. The rear door 133 may cover the opening 101 for the counter-box. A partition 134 suitably protected by an asbestos board 135 serves to keep all stray light out of the front part of the casing 1, the partition being pierced by suitable openings (not shown) for the projected light rays.

Variations may be resorted to within the scope of the invention, and portions of the improvements may be used without others.

Having thus described my invention, I claim:

1. The combination with a key-operated machine, of a counter operated thereby, a screen, a timing device including a clock-face and a hand movable with respect thereto to indicate elapsed time, and means for projecting upon the screen images of the clock-face and said hand in such relation as to indicate elapsed time and an image of the counter so that the number registered by the counter and the elapsed time may be observed substantially simultaneously.

2. The combination with a key-operated machine, of a counter operated thereby, a screen, a timing device including a clock-face and a hand, means for projecting an image of the counter, the clock-face and said hand upon the screen, and signaling means to indicate to an operative at said machine the stopping and starting of the clock-hand.

3. The combination with a key-operated machine, of a counter operated thereby, a screen, a timing device including a clock-face and a hand, means for projecting an image of the counter, the clock-face and the hand upon the screen, and a device automatically made effective at the starting and stopping of the clock-hand to indicate such starting and stopping.

4. The combination with a typewriting machine, of a counter operated thereby, a clock-face, a clock-hand, actuating means for said clock-hand, a screen, and means for simultaneously displaying upon said screen the numerals exposed on the counter, the clock-face and the clock-hand.

5. In a projection apparatus, a screen, a timing device including a clock-hand, a key-operated machine, an indicator for said machine, means for projecting images of the hand and indicator upon the screen, a signal for said machine to indicate when it should be operated, means to actuate said clock-hand, a finger-piece to render said actuating means effective, means for automatically rendering said actuating means ineffective, and means whereby the signal will indicate the starting and stopping of said hand.

6. In a projection apparatus, a screen, a timing device including a clock-hand, a key-operated machine, an indicator for said machine, a signal for said machine to indicate when the same should be actuated, means for projecting images of the hand and indicator upon the screen, actuating means for said clock-hand, a finger-piece to render said actuating means effective, means for automatically rendering said actuating means ineffective, a plurality of slides, means whereby the slides may be positioned successively for projection upon the screen, a finger-piece for starting said positioning means, and means whereby the signal will indicate the starting and stopping of the hand.

7. The combination with a key-operated machine, of a counter operated thereby, a screen, a lamp for projecting upon said screen an image of the counter, a clock face, a hand, and a lamp for simultaneously projecting said hand upon the same screen.

8. The combination with a key-operated machine, of a counter operated thereby, a screen, a lamp for projecting upon said screen an image of the counter, a clock face, a hand, a lamp for simultaneously projecting said hand upon the same screen, and means for signaling to an operative at said machine whether or not the clock hand is moving.

9. The combination with a key-operated machine, of a counter operated thereby, a screen, a lamp for projecting upon said screen an image of the counter, a clock face, a hand, a lamp for simultaneously projecting said hand upon the same screen, and a device automatically made effective at the movement of the clock hand to indicate that it is moving.

10. The combination with a typewriting machine, of a counter operated thereby, a screen, means for projecting on the screen an image of the numerals displayed by the counter, and means for simultaneously displaying upon said screen a time-keeping hand.

11. In a projection apparatus, in combination, a slide-carrier adapted to support a plurality of slides arranged around the circumference thereof, a shaft on which said carrier is supported, a friction device to cause said carrier to rotate with said shaft, an escapement mechanism normally effective to hold said carrier against rotation with said shaft, and means actuated by said shaft when rotating to operate said escapement-mechanism and permit the slides on the carrier to be brought successively into position for projection.

12. The combination with a casing, of a screen supported in an opening in said casing, two projection devices in said casing positioned to throw images on the same portion of the screen, a plate on which one of said projection devices is mounted, lugs in said casing against which said plate is positioned, and releasable latching devices for holding said plate in position against said lugs.

13. In a projection apparatus, a screen, a clock-hand normally at rest, a key-operated machine, means for projecting images of the hand and machine upon the screen, a signal for said machine to warn a person to begin to operate it, a finger-piece adapted to start said clock-hand, means for automatically arresting said hand, and means whereby the signal will indicate the starting and stopping of said hand.

14. In a projection apparatus, a screen, a clock-hand normally at rest, a key-operated machine, a signal for said machine to warn a person to begin to operate it, means for projecting images of the hand and machine upon the screen, a finger-piece adapted to start said clock-hand, means for automatically arresting said hand, a plurality of slides, means for successively projecting them automatically upon the screen, a finger-piece for starting said last-named means, and means whereby the signal will indicate the starting and stopping of the hand.

15. In a projection apparatus, a screen, a clock hand normally at rest, a motor for driving said hand, a circuit for said motor, a finger piece adapted to close said circuit, means for projecting an image of the hand on the screen, and means for holding the circuit closed during one revolution of the hand and then opening it.

16. In a projection apparatus, a screen, a clock hand normally at rest, a motor for driving said hand, a circuit for said motor, a finger piece adapted to close said circuit, means for holding the circuit closed during one revolution of the hand and then opening it, means for projecting an image of the hand on the screen, and means for simultaneously projecting another moving image upon said screen.

17. In a projection apparatus, a screen, a clock hand normally at rest, a universal motor for driving said hand, a circuit for said motor, a finger-piece adapted to close said circuit, means for holding the circuit closed during one revolution of the hand and then opening it, means for projecting an image of the hand on the screen, and an adjustable governor for said motor.

18. In a projection apparatus, a screen, a clock hand normally at rest, a universal motor for driving said hand, a circuit for said motor, a finger-piece adapted to close said circuit, means for holding the circuit closed during one revolution of the hand and then opening it, an adjustable governor for said motor, means for projecting an image of the hand on the screen, and a signal automatically operated by the motor.

19. The combination with a screen, of a clock hand normally at rest, a key-operated machine, a counter operated by said machine, a projection apparatus for said hand, a projection apparatus for the counter, a motor for driving said hand, a signal at said machine, a device made effective by the moving of the motor adapted to signal to an operator at said machine, and a circuit for the counter projection apparatus adapted to light a lamp therefor.

20. The combination with a casing, of a screen, an outer wall of the casing, a truncated cone forming a shield extending inwardly from said wall and having the screen at the bottom, a magic lantern projection apparatus adapted to throw an image on the screen, a plate carrying said apparatus and removably fitted against lugs in said casing, a second projection apparatus within the casing adapted to throw a second image on said screen simultaneously with the first, and a motor within the casing for causing one of said images to include a moving part.

21. The combination with a typewriting machine, of a timing device having means including a clock-face to indicate the number of units of elapsed time, and a counter operable by the typewriting machine, and including means to display in the clock-face the number run up in the counter during the elapsed time indicated on the clock-face.

22. The combination with a typewriting machine, of a timing device having means including a clock-face to indicate the number of units of elapsed time, a counter operable by the typewriting machine, and including means to display in the clock-face the number run up in the counter during the elapsed time indicated on the clock-face, and means to start said timing device for a test.

23. The combination with a typewriting machine, of a timing device having means including a clock-face to indicate the number of units of elapsed time, a counter operable by the typewriting machine, and including means to display in the clock-face the number run up in the counter during the elapsed time indicated on the clock-face, means to start said timing device for a test, and means for automatically stopping said timing device at the end of a predetermined period of time.

24. The combination with a typewriting machine, of a timing device having means including a clock-face to indicate the number of units of elapsed time in a predetermined period, and arranged to return to a zero reading at the end of such period, and a counter operable by the typewriting machine, and including means to display in the clock-face the number run up in the counter during the elapsed time indicated on the clock-face.

25. The combination with a typewriting machine, of a timing device having means including a clock-face to indicate the number of units of elapsed time, a counter operable by the typewriting machine, and including means to display in the clock-face the number run up in the counter during the elapsed time indicated on the clock-face, means to start said timing device for a test, and a starting signal for the typist rendered effective by the starting means for said timing device.

26. The combination with a typewriting machine, of means for exhibiting concomitantly, in such juxtoposition as to be seen at a single glance, the number of units of elapsed time and the number of words typed in said elapsed time, said exhibiting means comprising a timing device for displaying in a given position the successive numbers indicating the number of units of elapsed time, and a counter device for displaying in an adjacent position the successive numbers indicating the number of words typed.

27. The combination with a typewriting machine, of means for exhibiting concomitantly, in such juxtaposition as to be seen at a single glance, the number of units of elapsed time and the number of words typed in said elapsed time, said exhibiting means comprising a timing device for displaying in a given position the successive numbers indicating the number of units of elapsed time, a counter device for displaying in an adjacent position the successive numbers indicating the number of words typed, and means to start said timing device for a test.

28. The combination with a typewriting machine, of means for exhibiting concomitantly, in such juxtaposition as to be seen at a single glance, the number of units of elapsed time and the number of words typed in said elapsed time, said exhibiting means comprising a timing device for displaying in a given position the successive numbers indicating the number of units of elapsed time, a counter device for displaying in an adjacent position the successive numbers indicating the number of words typed, means to start said timing device for a test, and means for automatically stopping said timing device at the end of a predetermined period of time.

29. The combination with a typewriting machine, of means for exhibiting concomitantly, in such juxtaposition as to be seen at a single glance, the number of units of elapsed time and the number of words typed in said elapsed time, said exhibiting means comprising a timing device for displaying in a given position the successive numbers indicating the number of units of elapsed time in a predetermined period, and arranged to return to a zero reading at the end of such period, and a counter device for displaying in an adjacent position the successive numbers indicating the number of words typed.

30. The combination with a typewriting machine, of a timing device having means including a clock-face to indicate the number of units of elapsed time, a counter operable by the typewriting machine, and including means to display in the clock-face the number run up in the counter during the elapsed time indicated on the clock-face, and means to indicate to the typist that the timing device is operating.

31. The combination with a typewriting machine, of a timing device having means including a clock-face to indicate the number of units of elapsed time, a counter operable by the typewriting machine, and including means to display in the clock-face the number run up in the counter during the elapsed time indicated on the clock-face, and means controlled by the timing device for indicating to the typist that the timing device is operating.

32. The combination with a typewriting machine, of a timing device having means including a clock-face to indicate the number of units of elapsed time, a counter operable by the typewriting machine, and including means to display in the clock-face the number run up in the counter during the elapsed time indicated on the clock-face, means for starting the timing device, and means rendered effective by said starting device to operate said timing device for a predetermined period.

ALFRED E. OSWALD.

Witnesses:
JENNIE P. THORNE,
CATHERINE A. NEWELL.